(12) United States Patent
Andrews

(10) Patent No.: US 11,679,622 B2
(45) Date of Patent: Jun. 20, 2023

(54) WHEEL ASSEMBLY, METHOD OF MANUFACTURE AND USE THEREOF

(71) Applicant: Starco DML Ltd, Crewe (GB)

(72) Inventor: Michael Andrews, Crewe (GB)

(73) Assignee: Starco DML, Ltd, Crewe Cheshire (GB)

(*) Notice: Subject to any disclaimer, the term of this patent is extended or adjusted under 35 U.S.C. 154(b) by 275 days.

(21) Appl. No.: 16/766,148

(22) PCT Filed: Nov. 21, 2018

(86) PCT No.: PCT/GB2018/053371
§ 371 (c)(1),
(2) Date: May 21, 2020

(87) PCT Pub. No.: WO2019/102195
PCT Pub. Date: May 31, 2019

(65) Prior Publication Data
US 2020/0361237 A1      Nov. 19, 2020

(30) Foreign Application Priority Data
Nov. 21, 2017 (GB) ...................................... 1719278

(51) Int. Cl.
*B60B 25/04* (2006.01)
*B60C 7/26* (2006.01)
*B60C 7/00* (2006.01)

(52) U.S. Cl.
CPC ................ *B60B 25/04* (2013.01); *B60C 7/26* (2013.01); *B60B 2310/226* (2013.01); *B60B 2360/324* (2013.01); *B60C 2007/005* (2013.01)

(58) Field of Classification Search
CPC ........... B60B 25/04; B60C 7/00; B60C 7/102; B60C 7/24; B60C 7/26; B60C 2007/005
See application file for complete search history.

(56) References Cited

U.S. PATENT DOCUMENTS

| | | | | |
|---|---|---|---|---|
| 2,083,766 | A  * | 6/1937 | Wittkopp | B60C 7/24 152/394 |
| 7,878,600 | B2 * | 2/2011 | Krantz | B60C 7/24 301/5.309 |
| 2008/0179940 | A1* | 7/2008 | Hill | B60C 11/02 301/105.1 |
| 2011/0240189 | A1 | 10/2011 | Dutton | |
| 2015/0083295 | A1* | 3/2015 | Resa Rodrigo | B60C 7/10 152/306 |

FOREIGN PATENT DOCUMENTS

| | | | | | |
|---|---|---|---|---|---|
| CN | 110435358 A | * | 11/2019 | | B29D 30/02 |
| KR | 20150024970 A | * | 10/2015 | | B60C 7/26 |
| WO | 2008053450 A1 | | 5/2008 | | |
| WO | 2009009235 A1 | | 1/2009 | | |
| WO | WO-2018170583 A1 | * | 9/2018 | | B60C 7/102 |

* cited by examiner

*Primary Examiner* — Jason R Bellinger
(74) *Attorney, Agent, or Firm* — GableGotwals

(57) ABSTRACT

A wheel assembly and method of assembling the same for use with an airless or non-pneumatic tyre. The assembly includes a rim member and at least one locking or retaining member. The rim member includes a first portion at least part of which is adapted to be attached to an axle in use, and at least part of the locking member is configured to detachably attach to at least part of the first portion of the rim member. Attachment to the rim member assists in retaining the tyre in position on rim member and/or the wheel assembly in use.

18 Claims, 3 Drawing Sheets

WHEEL ASSEMBLY, METHOD OF MANUFACTURE AND USE THEREOF

CROSS REFERENCE TO RELATED APPLICATIONS

This United States application is the National Phase of PCT Application No. PCT/GB2018/053371 filed 21 Nov. 2018, which claims priority to British Patent Application No. 1719278.2 filed 21 Nov. 2017, each of which is incorporated herein by reference.

BACKGROUND OF THE INVENTION

The present invention relates to a new wheel assembly particularly applicable to airless or non-pneumatic tyres.

Although the following description refers to a wheel assembly incorporating polyurethane tyres the skilled person will appreciate that other airless or non-pneumatic tyre materials could be used, for example other polymers such as rubber, polyethylene, nylon and the like.

The use of airless or non-pneumatic tyres on heavy vehicles such as fork lift trucks is known. Typically a solid polyurethane tyre is fitted to a metal rim which is connected to the vehicle axle.

Solid airless tyres have the advantage of being able to carry a higher load without significant deformation as would be the case with a similar sized pneumatic tyre.

Airless tyres have a high rolling resistance and have issues with the heat build-up that occurs in use due to frictional forces. This heat causes the tyre to expand and can disrupt the close fit required to the rim. Refitting or replacing forklift tyres in particular is a laborious and time consuming task.

BRIEF SUMMARY OF THE INVENTION

It is therefore an aim of the present invention to provide a wheel assembly that addresses the abovementioned problems.

It is a further aim of the present invention to provide a method manufacturing a wheel assembly that addresses the abovementioned problems.

It is a yet further aim of the present invention to provide a method of using or fitting a wheel assembly that addresses the abovementioned problems.

In a first aspect of the invention there is provided a wheel assembly or apparatus suitable for use with an airless or non-pneumatic tyre, said assembly including;

a rim member and at least one locking or retaining member, said rim member including a first portion at least part of which is adapted to be attached to an axle in use, and at least part of said locking member is configured to detachably attach to at least part of the first portion of the rim member, wherein attachment to the rim member assists in retaining the tyre in position on rim member and/or the wheel assembly in use.

Typically the first portion of the rim member is substantially flat or planar member. Further typically the first portion of the rim member is a substantially circular or a disc.

In a preferred embodiment the rim member includes one or more second portions which depend from the first portion. Typically said second portions provide one or more locations on which at least part of an airless or non-pneumatic tyre can be engaged and/or attached in use.

Typically the first portion includes one or more formations for attachment to a vehicle axis. Further typically the formations include one or more apertures through which the rim member can be screwed or bolted to an axle.

Typically the first portion includes formations for attaching the locking member to the same. Further typically the formations include one or more apertures through which the rim member can be screwed or bolted to the locking member.

Typically the locking member has corresponding formations adapted to align and/or engage with the one or more formations on the rim member.

In a preferred embodiment, the locking member is a substantially flat or planar member. Typically the locking member is a disc or ring. Further typically a further part of said locking member extends beyond an edge or the circumference of the first portion and/or beyond the second portions.

In one embodiment the diameter or radius of the locking member is greater than the diameter or radius of at least the first portion of the ring member. Typically all or at least part of the edge of the locking member extends beyond the edge, or at least part of the edge of the first portion of the ring member.

In one embodiment the second portion forms a round, circular or substantially cylindrical surface onto which a tyre can be mounted.

In a preferred embodiment the rim member second portions form one or more rib portions. Typically a plurality of rib portions depend from the first portion.

In a preferred embodiment of the rim member includes one or more second portion or ribs portions. Typically said rib portions provide one or more formations to engage with at least part of the tyre in use. Further typically the rib portions engage and/or interlink with an inner portion or surface of the tyre.

In one embodiment the one or more second portions depend substantially inwardly from the first portion of the rim member. Typically said one or more second portions of the rim member depend inwardly substantially parallel to or adjacent to the axis of the axle on which the wheel assembly and/or rim member is mounted or connected to. Further typically the second portion or rib portions extend from the edge, or substantially towards the edge, of the first portion of the rim member.

In one embodiment the assembly includes a support portion. Typically the support portion forms part of, and/or is attached to the rim member. Further typically the support portion is a ring or disc.

In one embodiment the support portion is a substantially planar member. Typically the support portion is a planar ring or disc. Further typically the diameter or radius of the support portion is greater or larger than the diameter or radius of the first portion of the rim member.

In one embodiment the support portion is attached to or otherwise engages with at least part of the second portion or rib portions of the rim member. Typically the support portion is attached to the second portion a spaced distance from the first portion of the rim member. Further typically at least part of the second portion or rib portions extend between the first portion and the support portion.

In one embodiment the tyre is a polyurethane tyre. Typically the tyre includes two portions or layers. Further typically the inner portion or layer is harder than the outer.

In one embodiment the inner part of the tyre that engages with and/or is attached to the second portion or rib portions includes one or more recesses shaped to receive the same.

In one embodiment the inner portion of the tyre is a relatively hard elastomeric polyurethane moulding or overmoulding. Typically the relatively hard inner includes one or more rib and/or recess formations. Further typically relatively softer polyurethane outer tyre is moulded around the harder inner.

In one embodiment the tyre inner portion is an over moulding.

In one embodiment the substantially the whole tyre is formed by moulding.

In one embodiment the inner portion is substantially round or cylindrical. Typically the inner includes one or more formations. Further typically the formations include dogs, projections, recesses, ridges and/or the like. Further typically torque is transmitted through said formations.

Preferably the tyre inner, if the tyre includes an inner portion, includes one or more ridges. Typically the ridges extend substantially coaxially to the longitudinal axis of the axle.

In one embodiment the ridges are wedge shaped. Typically the ridges become thinner or taper as they extend towards the end or the axle and/or outer face of the tyre.

In one embodiment the tyre inner has a hardness at or around Shore 70D. This has enables the user to achieve the high dimensional accuracy required for fit to tyre and has the benefit of eliminating secondary operations to the rim and adds additional strength and integrity to the wheel assembly.

In one embodiment the tyre outer is over moulded. Typically the outer layer is first poured or moulded around a first core. Further typically the first core is removed or replaced with a second core of smaller diameter and the second inner layer poured or moulded.

In one embodiment the outer tyre or outer portion of the tyre is removed when changing, replacing or repairing the same.

In one alternative embodiment the tyre construction is substantially of uniform hardness and/or polymeric construction.

In one embodiment of the invention the rim member is part of and/or is formed integrally with an axle. Typically part of the axle and/or a shaped axle housing is, or functions as, the rim. Further typically in such an embodiment the wheel assembly comprises an axle, part of which is shaped to engage with and/or attach to a tyre, and a locking or retaining member.

In a second aspect of the invention there is provided a wheel assembly, said wheel assembly including an axle member and at least one locking or retaining member,
said axle member including a first portion at least part of which is adapted to be attached to and/or receive part of a tyre in use, and
at least part of said locking member is configured to detachably attach to at least part of the first portion of the axle member, wherein attachment to the axle member assists in retaining the tyre in position on the same in use.

In a third aspect of the invention there is provided a method of manufacturing or assembling a wheel assembly, said wheel assembly including a rim member and at least one locking or retaining member,
said rim member including a first portion at least part of which is adapted to be attached to an axle in use, and
at least part of said locking member is configured to detachably attach to at least part of the first portion of the rim member, wherein attachment to the rim member assists in retaining the tyre in position on rim member and/or the wheel assembly in use wherein said method includes the step of cutting at least the first portion and/or the rim member from sheet material.

Typically the sheet material is metal. Further typically the sheet material is sheet steel.

In a preferred embodiment of the invention at least the locking member and first portion of the rim member are cut from a single piece or the same sheet of sheet of material. Typically the locking member, first portion and/or support portion of the rim member are cut from a single or the same sheet of material. Further typically the cut performed using a laser.

In one embodiment the sheet material is configured such that the first portion is positioned inside the locking member. Typically the locking member and first portion have interlocking or complementary protrusions. Further typically the protrusions are teeth.

In a preferred embodiment the first portion is configured to lie inside the locking member as the same are cut from a planar sheet of material. Typically on assembly the first portion and/or locking member are orientated such that the protrusions or teeth abut, overlie, or are otherwise in contact.

In one embodiment the one or more formations are located on the protrusions or teeth of the first portion and/or locking member. Typically the formations are aligned and/or abutted when the wheel structure is being assembled. Further typically the formations are one or more apertures or holes which are aligned such that the first portion and the locking member can be bolted together.

In one embodiment the second portion or rib portions are welded to at least part of the first portion and/or support portion. Typically the first portion and support portion of the rim member are connected together by the second portion or rib portions. Further typically the first portion and support portion are located on parallel vertical planes when assembled. Typically the second portion or rib portions maintain the first portion and support portion a spaced distance from each other.

In a further aspect of the invention there is provided a method of manufacturing or assembling a wheel assembly, said wheel assembly including a rim member and at least one locking or retaining member,
said rim member including a first portion at least part of which is adapted to be attached to an axle in use, and
at least part of said locking member is configured to detachably attach to at least part of the first portion of the rim member, wherein attachment to the rim member assists in retaining the tyre in position on rim member and/or the wheel assembly in use wherein said method includes the step of casting and/or forging at least part of the assembly.

BRIEF DESCRIPTION OF THE DRAWINGS

Specific embodiments of the invention are now described with reference to the following figures wherein.

DETAILED DESCRIPTION OF THE INVENTION

Figure 1:
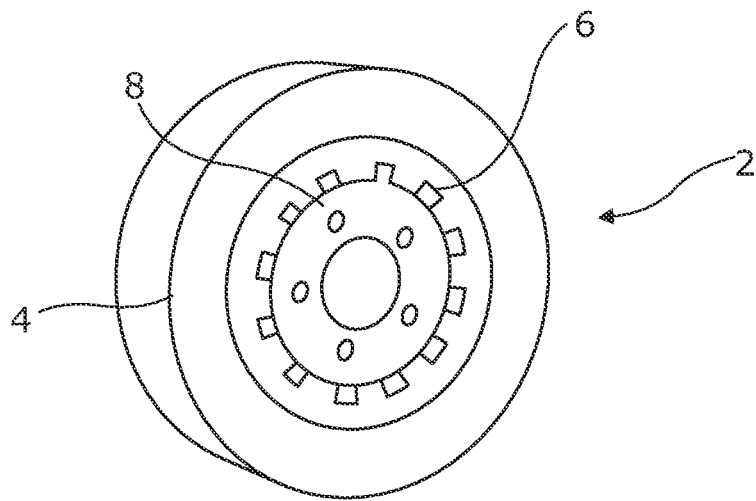
FIG. 1 shows a complete wheel assembly with tyre in accordance with one embodiment of the invention.

Turning initially to FIG. 1 which depicts a complete wheel assembly 2, which is shown with a tyre 4 fitted to the assembly. The tyre 4 in this example is a polyurethane tyre suitable for use on a fork lift truck wheel. The assembly 2 also includes a locking plate 6 which is attached to the outside of the wheel hub 8. The locking plate is used to keep or retain the tyre on the hub in use. The plate 6 is removed in the event the tyre needs changing or replacing due to wear, however the skilled person will appreciate that the wheel manufacture and/or construction disclosed herein is efficient enough to warrant replacement of the entire wheel rather than changing the tyre.

Figure 2:
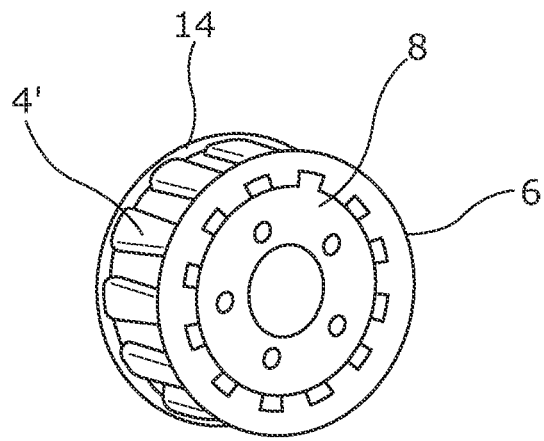
FIG. 2 shows the wheel assembly with the outer tyre removed in accordance with an embodiment of the invention.
Figure 3:
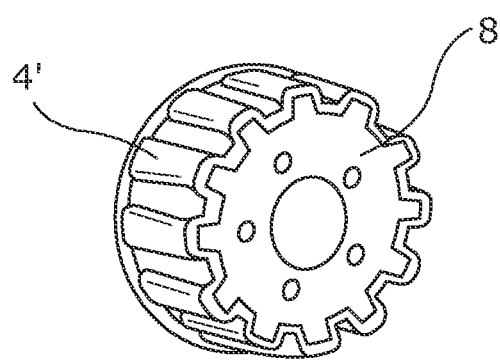
FIG. 3 shows the welded hub hard over-mould in accordance with one embodiment of the invention.
Figure 5:
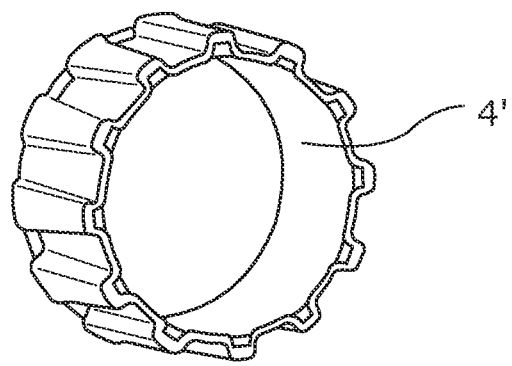
FIG. 5 shows a hard polyurethane over-mould in accordance with one embodiment of the invention.
Figure 6:
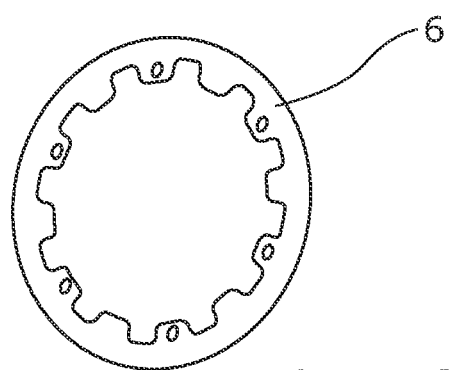
FIG. 6 shows a locking ring in accordance with one aspect of the invention.

The tyre construction is in this example formed from two layers, the inner layer being moulded from a harder or tougher polyurethane elastomer, typically circa Shore 70D. This has two functions: 1) to achieve the high dimensional accuracy required for fit to tyre. This has the benefit of eliminating secondary operations to the hub & 2) adds additional strength & integrity. The outer moulding is typically a softer polyurethane construction. FIG. 2 shows the wheel 2 with the outer tyre removed. The hub 8 is shown and the hard elastomeric over-moulding tyre layer 4' is visible. The wedge shaped ridges formed from the hard polyurethane are visible and FIG. 3 shows the same view with the outer locking disc or ring 6 removed. FIG. 5 shows the hard inner or over-moulding in isolation and FIG. 6 shows the locking ring 6 is isolation also.

Figure 4:
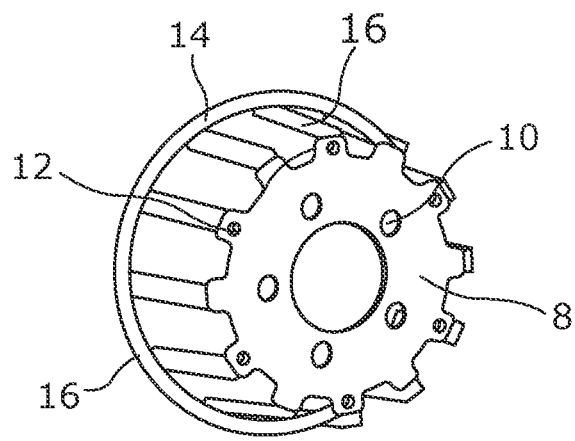
FIG. 4 shows the welded hub in accordance with one embodiment of the invention.

FIG. 4 shows the construction of the hub or hub 8 in more detail. The outer portion of the hub includes several inner apertures 10 for receiving bolts to attach the wheel to an axle (not shown). The skilled person will appreciate that the design of the present invention will permit axles having these features, so effectively there could be no hub, just a shaped axle/axle housing, tyre & locking ring. The hub 8 also includes outer apertures 12 through which the locking ring 6 is bolted and an inner ring 14 against which the tyre abuts. In this example the inner ring is attached to the main body of the hub 8 via a number of ribs 16, however the skilled person will appreciate that a substantially cylindrical or curved surface could be used to attach the inner ring 14 to the rib body. The advantage this particular example has is that the hub is strong and relatively light.

Figure 7A:
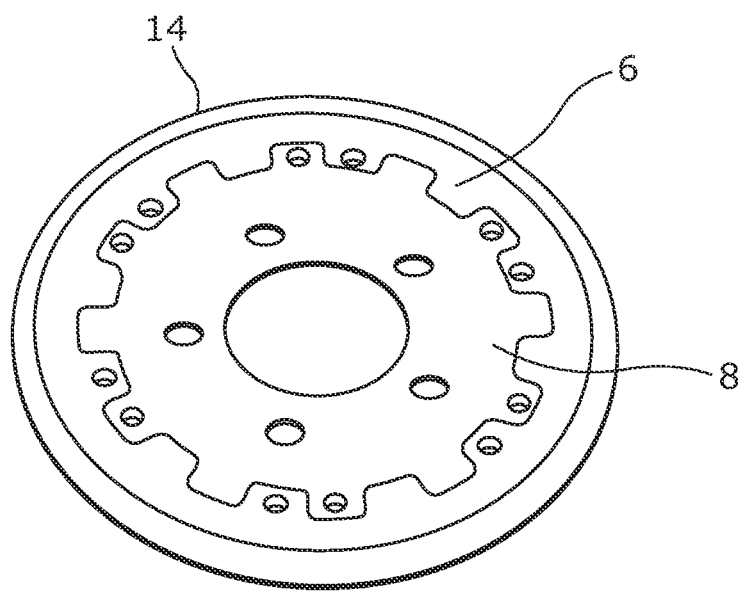
FIGS. 7a and 7b show how the rear tyre support, centre disc and removable locking ring can all be cut from one sheet in accordance with one aspect of the invention.
Figure 7B:
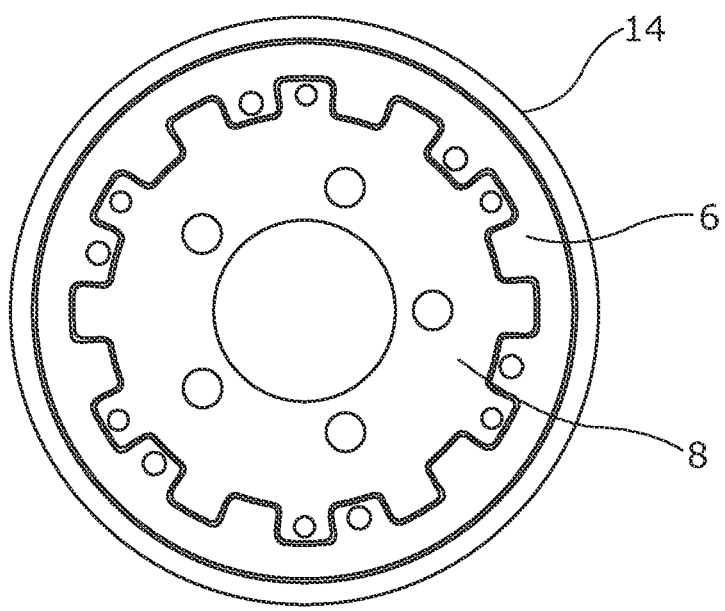

The hub is typically constructed from metal sections, typically steel, welded together. The inner ring 14, outer locking ring 6 and hub 8 body can be punched or cut, preferably laser cut, from a single sheet of material. FIGS. 7a and 7b shown the location of such pieces on a substantially planar sheet of material. The interlocking projections or lugs on the hub and locking ring ensure that once cut the outer ring need only be rotated (15 degrees in this example) such that the apertures 12 align and the pieces bolted together.

In this example if the hub is treated/coated appropriately, the polyurethane will bond to it giving additional strength. The polyurethane over-moulding also affords significant protection to the hub and offers opportunities for colours, moulded logos etc.

The invention claimed is:

1. A wheel assembly or apparatus suitable for use with an airless or non-pneumatic tyre, said assembly including;
a hub member and at least one locking or retaining member,
said hub member including a first portion at least part of which is adapted to be attached to an axle in use, and
at least part of said locking member is configured to detachably attach to at least part of the first portion of the hub member, wherein attachment to the hub member assists in retaining the tyre in position on hub member and/or the wheel assembly in use,
wherein the first portion includes formations for attaching the locking member to the hub member, the formations including one or more apertures through which the hub member can be screwed or bolted to the locking member and wherein the locking member has corresponding formations adapted to align and/or engage with the one or more formations on the hub member.

2. The wheel assembly according to claim 1 wherein the first portion of the hub member is a substantially flat or planar disc.

3. The wheel assembly according to claim 1 wherein the hub member includes one or more second portions which provide one or more locations on which at least part of the airless or non-pneumatic tyre can be engaged and/or attached in use.

4. The wheel assembly according to claim 1 wherein the first portion includes one or more formations for attachment to the vehicle axle including one or more apertures through which the hub member can be screwed or bolted to the axle.

5. The wheel assembly according to claim 1 wherein the locking member is a substantially flat or planar member.

6. The wheel assembly according to claim 5 wherein the locking member is a disc or ring wherein a further part of said locking member extends beyond an edge or the circumference of the first portion and/or beyond the second portions.

7. The wheel assembly according to claim 6 wherein the diameter or radius of the locking member is greater than the diameter or radius of at least the first portion of the ring.

8. The wheel assembly according to claim 3 wherein the second portion forms a round, circular or substantially cylindrical surface onto which the tyre can be mounted and the hub member second portions form one or more rib portions.

9. The wheel assembly according to claim 1 wherein the hub member includes one or more second portions to engage with at least part of the tyre in use.

10. The wheel assembly according to claim 7 wherein the one or more second portions are located inwardly from the first portion of the hub member.

11. The wheel assembly according to claim 10 wherein said one or more second portions of the hub member are located inwardly and parallel to or adjacent to the axis of the axle on which the wheel assembly and/or hub member is mounted or connected to.

12. The wheel assembly according to claim 1 wherein the wheel assembly includes a support portion forming part of, and/or is attached to, the hub member and is a ring or disc.

13. The wheel assembly according to claim 12 wherein the support portion is attached to or otherwise engages with at least part of the second portion of the hub member.

14. The wheel assembly according to claim 13 wherein the support portion is attached to the second portion a spaced distance from the first portion of the hub member and at least part of the second portion extend between the first portion and the support portion.

15. The wheel assembly according to claim 14 wherein the wheel assembly includes a polymeric overmoulding engaged with and/or is attached to the second portion.

16. The wheel assembly according to claim 15 wherein the over-moulding includes a polymer substantially harder than the tyre.

17. The wheel assembly according to claim 16 wherein an inner tyre or over-moulding is polyurethane, polycarbonate, acrylic, abs, nylon and/or polyester moulding or over-moulding.

18. The wheel assembly according to claim 17 wherein the inner tyre or over-moulding includes one or more ridges extending substantially coaxially to the longitudinal axis of the axle, said ridges are wedge shaped and become thinner or taper extending towards the end or the axle and/or outer face of the tyre.

* * * * *